though it be not particularly troublesome in the rendering or

United States Patent Office 3,787,596
Patented Jan. 22, 1974

3,787,596
TREATMENT OF WASTEWATERS FROM THE PROCESSING OF FISH
Edgar H. Pavia and Amulya D. Tyagi, New Orleans, La., assignors to Pavia-Byrne Engineering Corporation, New Orleans, La.
Filed Mar. 8, 1972, Ser. No. 232,717
Int. Cl. A22c 25/00
U.S. Cl. 426—488         10 Claims

ABSTRACT OF THE DISCLOSURE

A method for treating emulsified wastewater from fish processing plants by (1) degassifying the wastewater to break the emulsion and to remove any toxic gases and (2) separating the fish solids and oil from the deemulsified wastewater. This method allows the safe reuse of transport water used in the unloading of fish from boats.

BACKGROUND OF THE INVENTION

Figure 1:
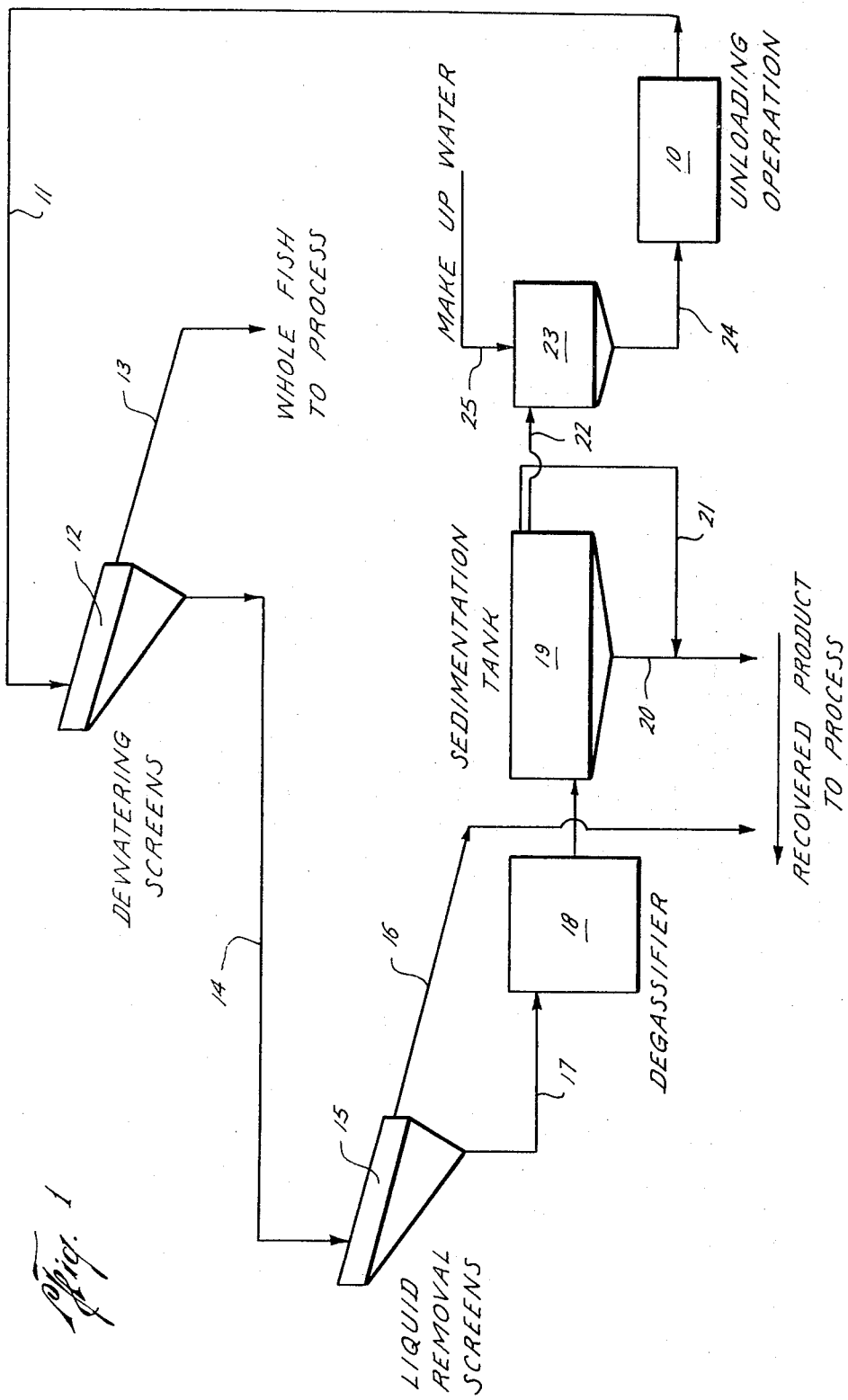

This invention relates generally to the treatment of wastewaters produced during the processing of fish. It has special application to emulsified wastewaters resulting from the processing of fish high in oil content, and more particularly to the emulsified transport water resulting from the unloading of fish from boats.

The problem of treating emulsified wastewaters has been most particularly troublesome in the rendering or reducing of whole fish to produce fish meal and oil. In North America species of fish commonly utilized are menhaden, alewives, anchovies, herring and mackerel, with menhaden being the most abundant. Fish meal is utilized as a feed supplement for poultry and swine, while fish oil is for a large part exported for use in margarines, shortenings and cosmetics.

Previously, liquid wastes from plants producing fish meal and oil have been discharged without any treatment, under the assumption that the wastes consisted only of material which had come from the aquatic environment and that therefore the wastes could not harm this environment. This assumption by segments of the fish industry has led to much difficulty with both state and federal regulatory agencies, especially in recent years when pollution control has been emphasized. This is because the primary waste material consists of bits and pieces of whole fish which are in a partially decomposed state. Since the pieces of fish are organic in nature, they create an oxygen demand on the receiving waters, thus depleting the amount of oxygen available to fish life inhabiting the receiving waters.

In the wet rendering process, the primary process for producing fish meal and oil from whole fish, the major source of pollution in terms of pounds per day of pollutants is the transport or bailing water stream which is utilized in unloading the fish from the boats and transporting them by pumping to the process plant. On reaching the processing unit the whole fish are removed from the transport water stream by a dewatering screen or other similar means. The catching, storing and pumping of the fish all result in damage to the whole fish, and consequently the transport water after the removal of the whole fish contains fish particles, fish oil and products of decomposition. It has been found that this stream will at times achieve a 5-day biochemical oxygen demand ($BOD_5$) in excess of 40,000 milligrams per liter (mg./l.) and a chemical oxygen demand (COD) in excess of 400,000 mg./l.

Obviously effluents from fish processing plants containing BOD concentrations in thousands of milligrams per liter are of considerable concern to the regulatory agencies, considering that most effluent standards for $BOD_5$ are less than 100 mg./l. The fact that large volumes of water are utilized in these plants further magnifies the problem. For example, a typical plant processing 5,000,000 menhaden fish per day would utilize 1,500,000 gallons of water to transport the fish from the boats to the dewatering screens.

As the result of fish kills in streams receiving wastewaters from menhaden and other similar fish processing plants, the regulatory agencies have become even more concerned about the early development of some method for effectively treating the effluents from these plants. Despite this pressure on the fish processing industry by the regulatory agencies, no feasible process or method has been developed for effectively treating the wastewaters from these fish processing plants.

Some fish processing plants in order to reduce the volume of wastewater being discharged have recycled or reused the transport water in the unloading of fish from more than one boat. However, the presence of hydrogen sulfide, a highly toxic and soluble gas, in the transport water stream resulting from the rapid decomposition of the bits and pieces of fish in the water has restricted this practice. This is because of several deaths that have occurred in the industry which are believed to have resulted from asphyxiation due to the presence of the hydrogen sulfide.

In considering possible methods of treating transport water discharged from menhaden and other similar plants, the use of normal biological or secondary treatment methods for oxidizing the waste constituents of the water was found not to be feasible or practicable because of the high BOD strength and large volume of this wastewater stream. Also investigated was the use of conventional methods and techniques for the removal or the recovery of the waste constituents, the fish solids and oil, from the wastewater. For instance, sedimentation, flotation, filtration, centrifuging, adsorption, reverse osmosis and ultra filtration were investigated but all were found to be unsatisfactory.

The primary problem in developing a feasible process for treating the transport water stream by recovery or removal of the waste constituents was the tenacious emulsion of fish oil and water which inhibited normal reaction to conventional methods of treatment. Although refrigeration was found to break the emulsion, the utilization of a process employing refrigeration would not be economically feasible in view of the approximately 1.5 million gallons of wastewater to be treated per day in a typical plant operation.

Also a factor in the development of a feasible and effective process for treating the transport water is the wide variations in the characteristics of the water, including the degree of emulsification. These variations can be attributed to the characteristics of the fish changing with time, the size of the fish catch, and the lag time between the catching and the time of processing. In addition, during the unloading operation the concentrations of the various waste constituents increase rapidly and reach their maximum value at the time three-fourths of the fish have been unloaded.

Finally, vacuum filtration was investigated although a search of the literature indicated that this technique had not been tried on any waste similar to transport water. Although this technique proved to be unsuccessful, as no filter cake was being formed, it was found that the solids and oil were separating in the filtrate after standing for a period of time. After further investigation it was realized that the stability of the emulsion had been broken by the vacuum.

Subsequent to this discovery, a brief reference to the use of a vacuum to break emulsions has been found in Chemical Engineers' handbook, Third Edition, 1950, at page 10004. However, no previous applications of a vacuum to break emulsions in either the fish industry or the wastewater treatment field have been found, and the applicability of such techniques in these fields is believed not to have been known or obvious to those skilled in the art.

DESCRIPTION OF INVENTION

The primary object of the present invention is to provide a method for obviating the water pollution problems resulting from the production of emulsified wastewater in the processing of fish. A more particular object of the invention is the development of a means for breaking the wastewater emulsion and recovery or removal of the waste constituents thereof.

These objects can be obtained by degassifying the emulsified wastewater and separating the fish solids and oil from the supernate of the deemulsified wastewater. The degassification is accomplished by the use of a vacuum.

This invention has particular application to processes where whole fish, such as menhaden, are rendered or reduced to produce fish meal and oil. In the degassification of emulsified transport water from these processes in accordance with the invention, a novel and unexpected result is obtained in the removal of most, if not all, of the hydrogen sulfide in the water, thus enabling the recycling or reuse of this water in the unloading of fish from other boats. As indicated previously, the hydrogen sulfide results from the rapid decomposition of bits and pieces of fish in the water. By lowering the temperature of the water during the degassification process and by removing most of the fish solids following the breaking of the emulsion, further production of significant amounts of hydrogen sulfide is prevented.

By removing most of the fish solids and oil from the transport water following the breaking of the emulsion, in excess of 90% of the $BOD_5$ content and in excess of 80% of the non-filterable solids and oil and grease are removed. Despite this substantial reduction of pollutants, which is only possible because of the breaking of the emulsion, the quality of the water will nevertheless probably be below that required by most regulatory authorities, primarily because of the gross amount of pollutants in the water initially. Consequently, if the wastewater remaining after the breaking of the emulsion and the removal of most of the fish solids and oil is to be discharged into nearby waters, further treatment will probably be required. When considering that a typical menhaden plant utilizes approximately 1.5 million gallons of water per day in the unloading of boats, it can be realized that substantial costs could still be incurred in further treating, even by the use of conventional methods, this large volume of water. Consequently, in order to avoid further treatment of large volumes of wastewater, the importance of removing the hydrogen sulfide from the water allowing its safe reuse becomes apparent.

A further advantage of the present invention is the recovery of large quantities of raw material from the wastewater for processing in the plant. As previously indicated, the main waste constituents are fish solids and oil. By being able to recover approximately 90% of these raw materials following the breaking of the emulsion, the potential exists for the recovery of the entire cost of the process by the extra revenue earned from the processing of these materials.

One embodiment of the method according to this invention is reflected in the simplified process flow diagram shown in FIG. 1. From the unloading operation 10, the fish in the transport water are transferred via conduit 11 to dewatering screens 12. The fish to be processed are removed through conduit 13. The wastewater stream from dewatering screens 12 is transported via conduit 14 to liquid removal screens 15 where fish solids of significant size are removed through conduit 16 to be processed to produce fish meal and oil. The emulsified wastewater stream from screens 15 is conducted via conduit 17 through degassifier 18 where the stream is subjected to a vacuum of greater than 10 inches of Hg. From the degassifier the deemulsified stream is transported to sedimentation tank 19 where the oil and the fish solids covered or saturated with oil are separated from the water. The oil is removed at the top of sedimentation tank 19 through conduit 21 and is combined with the fish solids which are removed at the bottom of the tank through conduit 20. The combined oil and fish solids mixture is then processed to produce fish meal and oil. The supernate or the water from which the fish solids and oil have been removed is conveyed from tank 19 through conduit 22 to tank 23. The water from this tank can then be reused for other unloading operations through conduit 24. Make-up water as needed may be added to tank 23 through conduit 25.

The liquid removal screens shown in FIG. 1 are used to recover large pieces of fish solids that can be removed from the transport water without breaking the emulsion. However, the use of these screens is not essential to the proper operation of the invention.

A conventional vacuum tower can be utilized in the degassification step of the process. The vacuum necessary to break the emulsion can vary from about 10 inches of Hg to about 28 inches of Hg. It has been found preferable to operate at the upper level of this range, that is, from about 26 inches to about 28 inches of Hg.

The process according to this invention utilizes degassification to remove the dissolved gases and some water molecules, and to destroy the equilibrium between the components of the emulsion so as to allow them to act as free agents and respond to normal separation processes. Once the emulsion was broken, it was found that the constituents responded to conventional separation processes, that is, heavier material settled to the bottom and lighter material floated to the top. Any conventional separation equipment, such as a sedimentation tank, may be used for separation of the materials.

Table I shows a statistical analysis of the primary pollution parameters of the transport water after screening (by the liquid removal screens) from data obtained during one season of operation.

TABLE I.—STATISTICAL ANALYSIS OF TRANSPORT WATER AFTER SCREENING

| Parameter | Maximum concentration (mg./l.) | Minimum concentration (mg./l.) | Mean concentration (mg./l.) | Standard deviation |
|---|---|---|---|---|
| Total solids | 54,932 | 9,759 | 24,194 | 10,990 |
| Nonfilterable solids | 48,916 | 628 | 12,624 | 10,167 |
| Dissolved solids | 34,716 | 1,464 | 13,335 | 8,231 |
| Oil and grease | 33,834 | 508 | 11,738 | 7,735 |
| $BOD_5$ | 39,900 | 1,140 | 14,996 | 10,419 |

When it is considered that a typical plant, processing 5,000,000 menhaden fish per day would utilize 1.5 million gallons of water to transport the fish from the boats to the dewatering screens, the data in Table I would indicate that even after screening this stream would have a loading of 187,500 lbs. per day of BOD$_5$, and contain 157,737 lbs. of non-filterable solids, primarily pieces of fish flesh, and 146,666 lbs. of fish oil.

Figure 2:
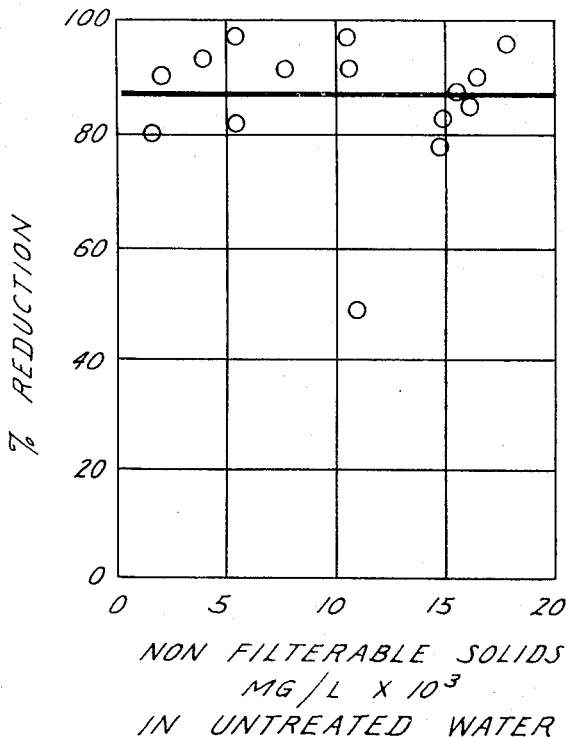
Figure 3:
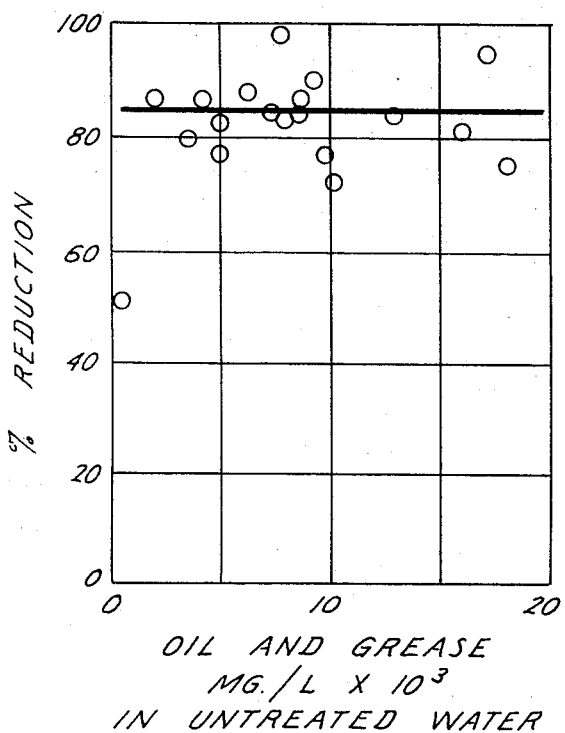

In FIGS. 2 and 3, the percent reduction in both non-filterable solids and oil and grease concentration in the clear liquor stream after degassification and sedimentation is plotted against their initial concentrations. These graphs show that the percent reduction in the concentration of these two constituents remains relatively constant regardless of their initial concentration in the transport water and that the reduction in non-filterable solids is accompanied by an almost equal reduction in the concentration of oil and grease. It will be noted that in almost all cases reduction of non-filterable solids of oil and grease is better than 80%, regardless of initial concentration.

Figure 4:
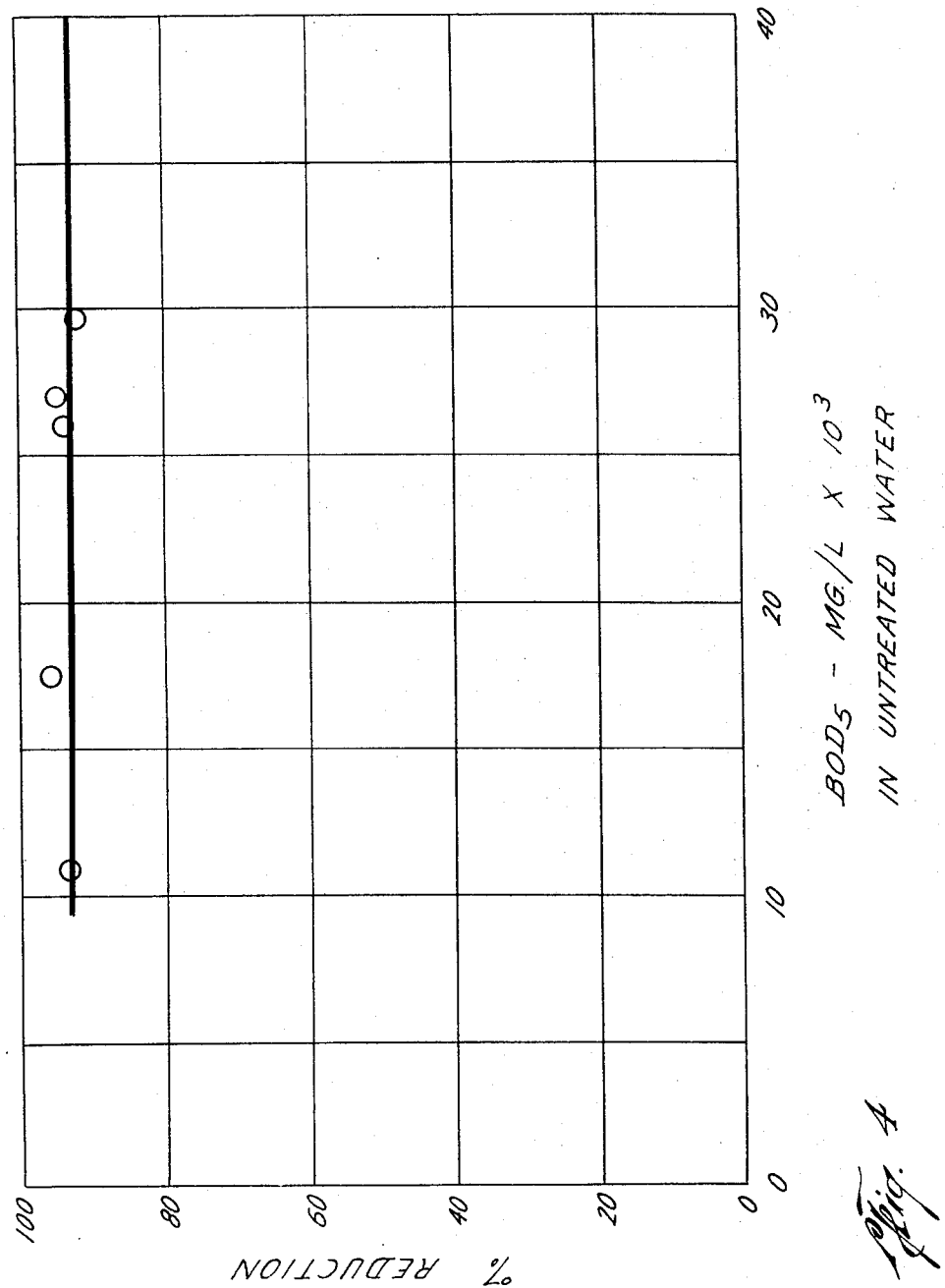

The expected reduction in oxygen demand by removal of the solids and oil from the transport water stream is confirmed by the graph shown in FIG. 4, which shows better than a 90% reduction in BOD$_5$. This parameter also appeared to have a consistent degree of removal regardless of initial concentration.

The hydrogen sulfide gas dissolved in the tranport water stream is removed therefrom during the degassification process. By virtue of the degassification causing a decrease in temperature of the wastewater and the removal of a large portion of the fish solids from the water, further production of significant levels of hydrogen sulfide is prevented, thereby allowing the safe reuse of the water.

We claim:

1. In the processing of fish, a method for the treatment of emulsified wastewater comprising:
    (a) degassifying the emulsified wastewater at ambient temperatures and temperatures below ambient by subjecting the emulsified wastewater to a vacuum to break the emulsion by removing the dissolved gases therefrom, thereby producing a degassified and deemulsified wastewater; and
    (b) separating in a separate step the fish solids and oil from the degassified and deemulsified wastewater.

2. The method according to claim 1 wherein the fish is selected from the group consisting of menhaden, alewives, anchovies, herring and mackerel and the wastewater is transport water.

3. In the processing of fish to produce fish meal and oil, a method for the safe reuse of emulsified transport water produced in the unloading of fish from boats comprising:
    (a) subjecting the emulsified transport water to a vacuum to break the emulsion by removing the dissolved hydrogen sulfide gas and other dissolved gases therefrom, thus producing a degassified and deemulsified wastewater;
    (b) recovering in a separate step the fish solids and oil from the degassified and deemulsified transport water;
    (c) processing the fish solids and oil recovered from the transport water in step (b) to produce fish meal and oil; and
    (d) reusing the treated transport water from step (b) in the unloading of fish from boats.

4. The method according to claim 3 wherein the vacuum in step (a) is from about 10 inches of Hg to about 28 inches of Hg and wherein the fish solids and oil are recovered in step (b) by gravity sedimentation.

5. The method according to claim 3 wherein the fish are menhaden fish and wherein the vacuum in step (a) is from about 26 inches of Hg to about 28 inches of Hg.

6. The method according to claim 3 wherein large fish solids are first recovered from the emulsified transport water by screening and are then combined with the fish to be processed.

7. In the processing of fish, a method for the treatment of emulsified wastewater comprising:
    (a) degassifying the emulsified wastewater by subjecting the wastewater to a vacuum in the range from about 10 inches of Hg to about 28 inches of Hg to break the emulsion by removing the dissolved gases therefrom, thus producing a degassified and deemulsified wastewater; and
    (b) separating in a separate step the fish solids and oil from the degassified and deemulsified wastewater.

8. The method according to claim 7 wherein the separation in step (b) is accomplished by gravity sedimentation.

9. The method according to claim 7 wherein the fish is selected from the group consisting of menhaden, alewives, anchovies, herring and mackerel and the wastewater is transport water.

10. The method according to claim 9 wherein the fish solids and oil recovered in step (b) are processed to produce fish meal and oil, and the treated transport water from step (b) is reused in the unloading of fish from boats.

References Cited
UNITED STATES PATENTS

| | | | |
|---|---|---|---|
| 2,179,131 | 11/1939 | Millard | 55—172 |
| 3,363,399 | 1/1968 | Schmauch et al. | 55—172 |
| 3,606,731 | 9/1971 | Cole et al. | 55—45 |
| 2,730,190 | 1/1956 | Brown et al. | 55—45 |
| 3,598,606 | 8/1971 | Spinelli | 99—7 |

LIONEL M. SHAPIRO, Primary Examiner